(12) United States Patent
Swift et al.

(10) Patent No.: US 9,714,072 B2
(45) Date of Patent: Jul. 25, 2017

(54) DAMPER SYSTEM FOR BOAT DOCKS

(71) Applicant: DISNEY ENTERPRISES, INC., Burbank, CA (US)

(72) Inventors: Brooke M. Swift, Orlando, FL (US); Eric J. Moy, Orlando, FL (US); Dennis M. Lind, Orlando, FL (US); J. Douglas Smith, Orlando, FL (US); Casey L. McKibben, Ocoee, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/979,830

(22) Filed: Dec. 28, 2015

(65) Prior Publication Data

US 2017/0183065 A1   Jun. 29, 2017

(51) Int. Cl.
*B63B 59/02* (2006.01)
(52) U.S. Cl.
CPC .................... *B63B 59/02* (2013.01)
(58) Field of Classification Search
CPC ...................................... B63B 59/02
USPC ........................................ 114/219
See application file for complete search history.

(56) References Cited

U.S. PATENT DOCUMENTS

| 2,737,142 | A | * | 3/1956 | Armando | ................. | E02B 3/26 |
| | | | | | | 114/219 |
| 2,960,055 | A | * | 11/1960 | Tomek | ..................... | E02B 3/26 |
| | | | | | | 114/219 |
| 3,554,527 | A | * | 1/1971 | Hall | ...................... | F16F 9/0481 |
| | | | | | | 114/219 |
| 3,771,778 | A | * | 11/1973 | Muller | .................... | B63B 59/02 |
| | | | | | | 267/140 |
| 4,252,073 | A | * | 2/1981 | Hartung | ................. | B63B 59/02 |
| | | | | | | 114/219 |
| 5,671,692 | A | * | 9/1997 | Kimball | ................. | B63B 59/02 |
| | | | | | | 114/219 |
| 7,287,483 | B2 | * | 10/2007 | Thompson | ............. | B63B 59/02 |
| | | | | | | 114/219 |
| 7,721,667 | B2 | * | 5/2010 | Kaemmerling | ........ | B63B 59/02 |
| | | | | | | 114/219 |
| 8,814,475 | B1 | * | 8/2014 | Landes | ..................... | E02B 3/26 |
| | | | | | | 114/219 |
| 2003/0005873 | A1 | * | 1/2003 | Vretta | ...................... | E02B 3/26 |
| | | | | | | 114/219 |
| 2003/0217684 | A1 | * | 11/2003 | Chaffee | .................. | B63B 59/02 |
| | | | | | | 114/361 |

(Continued)

*Primary Examiner* — Lars A Olson
*Assistant Examiner* — Jovon Hayes
(74) *Attorney, Agent, or Firm* — Marsh Fischmann & Breyfogle LLP; Kent A. Lambke

(57) ABSTRACT

Dampers for mounting on a dock to control landing a boat. The dampers may be used individually or in damper systems made up of a plurality of dampers. Each damper has a flexible body with one or more sidewalls defining an inner chambers, and orifices are provided in one of the sidewalls to allow the chamber to be filled with water when the damper is in an at-rest state. When the boat approaches the dock and contacts the damper or the outer set of dampers in a damper assembly/system, the collision or impact force applied by the boat against the outer surfaces of the damper (s) causes the damper body to be compressed, which causes the sidewalls of the chamber to collapse so as to expel water out of the inner chamber via the orifices so as to reduce the speed of the boat at a desired rate of deceleration.

31 Claims, 14 Drawing Sheets

(56) References Cited

U.S. PATENT DOCUMENTS

| | | | |
|---|---|---|---|
| 2004/0016383 A1* | 1/2004 | Aschenbach | B63B 59/02 114/219 |
| 2006/0137589 A1* | 6/2006 | Thompson | B63B 59/02 114/219 |
| 2008/0041290 A1* | 2/2008 | Stewart | E02B 3/26 114/219 |
| 2009/0260558 A1* | 10/2009 | Kaemmerling | B63B 59/02 114/219 |

* cited by examiner

DAMPER SYSTEM FOR BOAT DOCKS

BACKGROUND

1. Field of the Description

The present description relates, in general, to docking a boat in a safe and controlled manner, and, more particularly, to dampers and damper systems/assemblies for use on a boat dock to prevent or manage the "collision" with the dock. In the following description, the term "boat" is intended to include nearly any type of watercraft including boats, vessels, rafts, and the like that may carry cargo and/or passengers (e.g., passenger watercraft used in water-based rides or attractions at amusement or theme parks). The term "dock" is intended to include nearly any structure used to receive a boat such as for passenger and/or cargo embarking and disembarking (passenger and/or cargo loading and unloading).

2. Relevant Background

Passenger boats and other boats are used in many settings where it is desirable to land the boat at or against a dock in a safe and controlled manner. For example, amusement and theme parks have many water-based rides (or attractions) where passengers are loaded onto the boat from a dock at the start of the ride and unloaded from the boat at the end of the ride. It is important for the boat to land at the dock in a manner that is not abrupt or impacting in order to make the end of the ride enjoyable and safe. In some cases, the passengers may not be restrained in their seats in the boat and may even be standing or walking around when the boat is approaching the dock. It is undesirable for the boat to strike the dock with sufficient force that may cause the passengers to be jerked about as they may lose their balance and possibly be injured.

Currently, as a boat approaches a dock, the boat operator must steer or maneuver the boat under its own power to safely land against or near the dock. For example, the operator may have to vary the boat's speed in a very specific manner while concurrently orienting the boat in order to land at the dock with minimal to no contact. Most water transportation relies on human operator skill, which varies significantly between operators. This results in docking variation from both operator-to-operator and docking-to-docking from the same operator. Further, if an inability to decelerate the boat should arise (e.g., due to operator failure, mechanical failure, wind gusts, and so on), there is a risk that the boat may collide with the dock with too high of a force.

Hence, there remains a need for devices or systems for allowing boats to approach and land at docks in a more controlled manner. Preferably, the devices and systems would be designed such that a boat could be landed or "docked" with predictable forces (low impact collisions, for example) that are below some predefined maximum impact force regardless of the operator's skills and the boat's ability to slow down.

SUMMARY

Briefly, dampers are described that can be mounted onto the expected contact surfaces of a dock. The dampers may be used individually or, more commonly, in damper assemblies or systems made up of a plurality of dampers. Each damper has a body formed of a flexible material with exterior sidewalls defining an inner chamber. On one, two, or more sidewalls orifices or fluid openings are provided to provide passageways to the inner chamber (e.g., on portions of the body that are below the water surface, on portions of the body that are above the water surface, and so on). Each chamber is filled with water, via the orifices or openings, when the damper is in a first state (e.g., when the boat is spaced apart from the dock and the damper).

As the boat approaches the dock and strikes/contacts the damper or the outer set of dampers in a damper assembly/system, the collision or impact force applied by the boat against the outer surfaces of the damper(s) causes the damper body to be compressed, which causes the sidewalls of the chamber to collapse, i.e., the width of each chamber is reduced from a first width to a second smaller width (which may be at or near zero width if the chamber is fully collapsed) so as to expel the water out of the chamber via the orifices or openings in the sidewalls. The orifices or openings in the sidewalls may have differing sizes ("widths" or "diameters") and/or cross-sectional shapes (e.g., circular, rectangular or other polygonal shape, or the like) and patterns.

For example, some dampers in a damper assembly may have a single large diameter, circular hole in one or more sidewalls while other dampers in the assembly may have numerous orifices/holes with smaller diameter, circular holes in one or more sidewalls to define passageways for fluid to enter and be expelled from the inner chamber of these two types/designs of dampers. In other words, each damper of a damper assembly is a hollow container, and its damping function is defined by its overall size (i.e., the volume of fluid that can be contained in the inner chamber), the material used to form the sidewalls of the damper body, the thickness of the sidewalls, and the orifices in the sidewalls (i.e., their geometries, their sizes (diameters or widths or the like), their numbers, their pattern on the sidewalls, and so on).

The damping ability of each damper is predictable (e.g., based on the material used for the body, the size, shape, and number of chambers in the body, the height of the body and chambers, the size and number of orifices/holes in the sidewalls, and other physical parameters of each damper). With the characteristics of each damper known, a system or assembly of dampers can be designed to achieve a desired damping for boats expected to land at a dock. The dampers may be arranged in parallel, series, or both in parallel and in series to obtain desired response of a boat-to-dock contact. For example, a damper assembly for a dock may include two or more rows of dampers. The outer row may include dampers with a first design that require less force to compress and expel water from its chamber or chambers, and this provides more gradual deceleration during the initial high velocity collision between the dock and the damper assembly. A next or middle row may include dampers with a second design that require more force to compress so as to provide continued gradual deceleration once the first row has been fully compressed and the boat velocity has been reduced. A next or inner row may include dampers with a third design that require even more force to compress so as to provide continued gradual deceleration once the first and second rows have been fully compressed and the boat velocity is very low. In this stepped manner, the speed of a boat can be reduced in a controlled (i.e., gradual) manner that does not produce undesirable jarring forces on the boat and passenger/cargo as it lands at a dock equipped with the damper assembly. The damper assembly provides the boat with a failsafe stopping method in the event of braking failure and allows for a wide variation in operator skill to produce a "soft" docking experience for the boat and its passengers/cargo.

More particularly, a damper system is described for use in controlling landing of a boat at a dock. The damper system includes a first set of dampers and a second set of dampers. Each of the dampers in the first set of dampers has a body formed of a first flexible material, e.g., a fabric, plastic, or composite material with relatively high tensile strength, low flexural modulus of elasticity, and high tensile modulus of elasticity, which allows large elastic bending deformation with minimal elongation (i.e., allowing the damper to collapse without allowing the sidewalls to stretch in length or width). Each of these dampers also includes an inner chamber defined by exterior sidewalls of the body with one-to-multiple orifices in one or more of the sidewalls providing a passageway for receiving a first volume of incompressible fluid when the body is in an at-rest state (and submerged in a body of water or other incompressible fluid near the dock). Each of the dampers in the second set of dampers includes a body formed of a second flexible material (which may be the same as or differ from the first flexible material). Each of these dampers also includes an inner chamber defined by exterior sidewalls of the body with one or more orifices defining a passageway for receiving a second volume of incompressible fluid, differing from the first volume of fluid, when the body is in an at-rest state. By providing chambers adapted for receiving differing volumes of an incompressible fluid such as water, each damper provides a differing force response in the system. In other embodiments, the first and second volumes are equal, but the dampers in the second set include a different number of orifices with the same or differing size or shape than the orifices of the dampers in the first set, whereby differing flow passageways are defined to the inner chambers of the two sets of the dampers so as to define differing damping functionality for the two sets of dampers.

In some implementations of the damper system, the first and second sets of dampers are arranged in first and second adjacent and abutting rows, whereby one of the first and second rows of dampers is positionable against a surface of the dock and the other one is spaced apart from the dock for receiving the boat during the landing. In some useful damper systems, the bodies of the first and second sets of dampers have matching outer shapes and sizes to facilitate stacking or arranging a plurality of the dampers into a system or assembly that can be readily attached to or positioned near a dock (or on a boat's hull in some cases). For example, the outer shapes may be rectangular or cylindrical to enable better stacking in a damper system.

In some implementations of the damper system, each of the dampers in the first set of dampers has a first damping coefficient while each of the dampers in the second set of dampers has a second damping coefficient differing from the first damping coefficient. In the same or other implementations, each of the dampers in the first set of dampers is configured, when under a first predefined compressive force, to be elastically deformed from the at-rest state with the first volume of the fluid in the inner chamber to a compressed state in which at least a fraction of the first volume of the fluid is ejected from the inner chamber via the orifice. Each of the dampers in the second set of dampers is configured, when under a second predefined compressive force differing from the first predefined compressive force, to be elastically deformed from the at-rest state with the second volume of the fluid in the inner chamber to a compressed state in which at least a fraction of the second volume of the fluid is ejected from the inner chamber via the orifice. For example, the fractions of the first and second volumes of the fluid being ejected is in the range of 9/10 and 10/10 (or, stated differently, 90 to nearly 100 percent of the fluid may be forced out of the inner chambers when the bodies have a compressive force of at least some predefined magnitude applied to them).

The amount of damping may be chosen to define a distance of travel by a boat as its kinetic energy is absorbed by the damping system. For example, each of the dampers in the first set of dampers can be configured to be elastically deformed from the at-rest state to a compressed state, whereby a depth of the body of each of the dampers in the first set of dampers is reduced by a first predefined magnitude (i.e., the boat travels a first distance as it deforms dampers in the first set). Each of the dampers in the second set of dampers can be configured to be elastically deformed from the at-rest state to a compressed state, whereby a depth of the body of each of the dampers in the second set of dampers is reduced by a second predefined magnitude differing from the first predefined magnitude (e.g., the boat travels a second distance as it deforms the dampers of the second set). In this way, a maximum amount of travel for the boat after initial contact with the damper system up to the point where the dampers are compressed is defined by a combination of the first and second predefined magnitudes (e.g., how much the bodies of the dampers have their thickness or depth, as measured from a surface facing toward an approaching boat to a surface facing toward the dock, decreased).

DETAILED DESCRIPTION OF THE PREFERRED EMBODIMENTS

Briefly, the present description is directed toward dampers and damper assemblies or systems including a plurality of such dampers. The damper or damper system is mounted to the surfaces of a dock where a boat is expected to land and is configured to control the landing of a boat at a dock. The damper system may be thought of as a passive impact absorption device that can be used to decelerate a moving watercraft or boat in a controlled manner.

Figure 1:
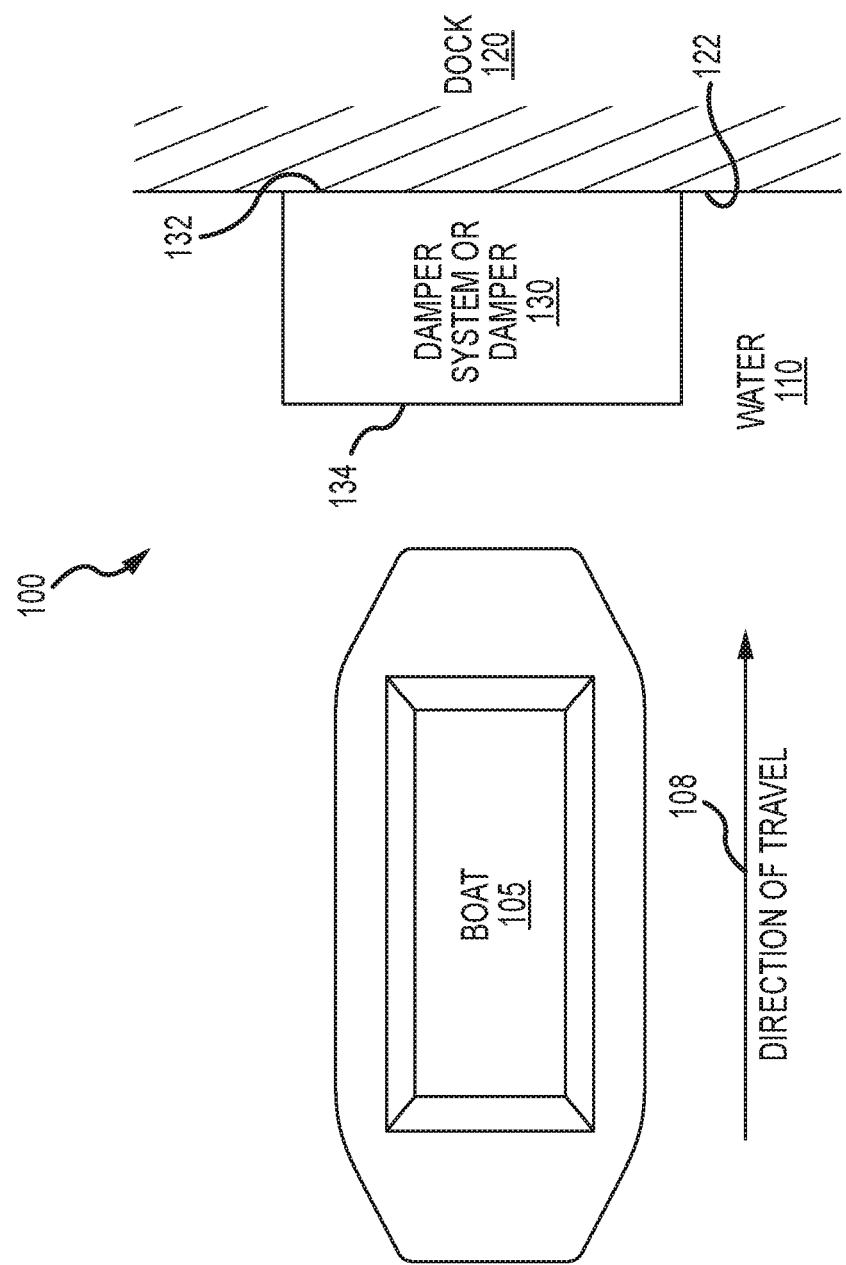
FIG. 1 is schematic or functional block drawing of a damper system in use in a water navigation system.

FIG. 1 illustrates a water navigation system 100 that includes a damper system or damper 130 of the present description. FIG. 1 is a top view of the water navigation system 100 showing a boat 105 traveling (as shown with arrow 108) in a body of water 110 toward a dock 120. The damper system or damper 130 is mounted onto a contact surface 122 of the dock 120, where the boat 105 will land on the dock 120 to disembark passengers and/or cargo and then embark a new set of passengers and/or cargo. Specifically, a first portion 132 of the damper system or device 130 is placed near or in abutting contact with the surface 122 of the dock 120 while a second portion 134 of the damper system or device 130 is spaced apart from the dock 120 and is positioned so as to provide an initial contact surface for the boat 105 (rather than the boat 105 colliding with the dock surface 122).

As will be explained in more detail below, each damper in the system 130 has an inner chamber that is filled with a volume of the water 110 prior to collision between the boat 105 and the damper system 130. The dampers of the system 130 are typically fully (or mostly) submerged in the water 110 to submerge one or more inlets/outlets or orifices or openings to the inner chambers so that the open orifices provide fluid passageways to the inner chamber of each of the dampers to fill the dampers with the surrounding fluid. When the boat 105 impacts the damper system 130 on outer portion 134 (i.e., a leading edge of the boat 105 contacts and applies a force against an outer row of dampers in the system 130), the boat 105 may be traveling as shown with arrow 108 at an unsafe or undesirably high speed for docking or landing at the dock 120. The damper system 130 acts to decelerate the boat at a desired (and previously calculated/predicted) rate; thus, the boat 105 safely comes to a stop near the surface 122 of the dock 120.

Each damper in the system 130 is a flexible, fluid-filled vessel with a specially-sized and shaped inner chamber defined by exterior sidewalls of the body of the damper for receiving the surrounding fluid (e.g., water or other incompressible liquid). Each chamber has one to many orifices or openings in one end of the body (or in one sidewall defining the inner chamber), and this orifice-containing end (the bottom or lower sidewall of the body of the damper in some cases) is positioned facing the body of water 110 (e.g., so that the inner chamber is open and exposed to the water 110 via the orifices in the sidewall(s) of the damper body), and the body of the damper is submerged into the water 110. The designs may include using one large void or space or, in some cases, multiple smaller voids to provide an inner chamber for the volume of fluid to be received within the body of the damper. Each damper may receive the same or, more typically, differing volumes of fluid in their inner chamber, which will be expelled from the damper's body (e.g., via the one to many orifices/openings to the inner chamber) when a boat applies a force onto the body causing the chamber's sidewalls to collapse, thereby changing the chamber's volume from a first volume (maximum volume) to a second volume (which may be the minimum volume if fully or nearly fully collapsed).

In use, when the body of the damper is compressed during impact by a boat, the internal pressure forces the water out of the inner chamber via the sidewall orifices back into the surrounding body of water. When the water flows through the orifices, it generates frictional losses that convert some of the kinetic energy of the moving boat into heat, such that as the kinetic energy of the boat is converted by the dampers the boat slows down and eventually stops. Once the body of the damper is no longer being compressed by the boat, the damper's body, which is formed of a flexible material such as a plastic, a rubber/plastic-coated fabric, or the like (with one implementation using a polyester while another utilizes a nitrile rubber-coated Kevlar fabric) with a low flexural modulus of elasticity, a high tensile modulus of elasticity, and relatively high tensile strength, returns to its first state (e.g., rest state or non-compressed state) and original shape. This causes water to again be drawn into the inner chamber through the orifices making the damper fully reusable. During normal or everyday operations, the dampers of a damper system will impart minimal reaction force onto the boat and not affect normal docking procedures. The system is typically completely passive.

FIGS. 2-5 illustrate four different embodiments of dampers 200, 300, 400, and 500 of the present description that may be used individually or within a damper system such as system 130 shown in FIG. 1. Each of the dampers 200, 300, 400, and 500 has a body 210, 310, 410, and 510 that is formed of a material (e.g., a flexible material such as a polyester or nitrile rubber-coated Kevlar fabric) to provide a body that can be compressed from the at-rest state (or first state) shown into a compressed state (or second state) (not shown) such as when a boat applies a force to a side of the body 210, 310, 410, and 510. The bodies 210, 310, 410, and 510 are shown to be rectangular in shape, and this may be useful when the dampers 200, 300, 400, and 500 are to be used in a system with a plurality of dampers arranged in rows as this "box" shape is easier to stack in a variety of configurations.

Figure 2:
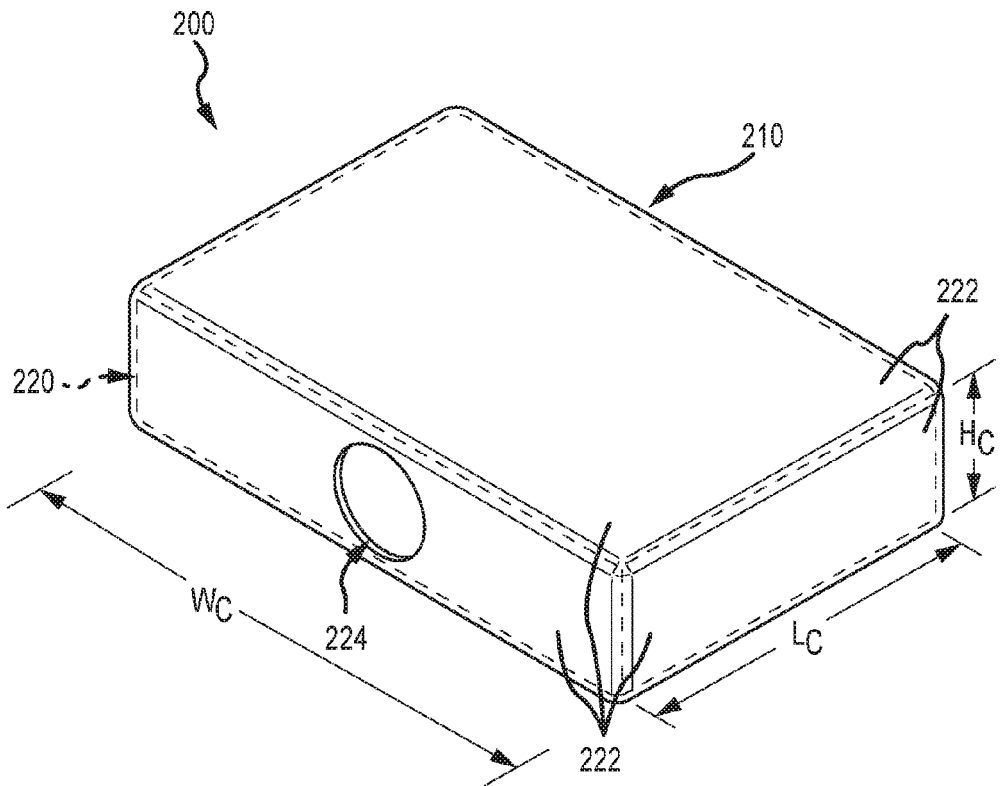
FIGS. 2-5 illustrate four exemplary dampers that may be used individually or in damper systems, such as the damper system of FIG. 1.

With reference first to FIG. 2, the damper 200 has a rectangular body 210 with a rectangular inner chamber 220 (but other inner chamber shapes may be used) provided in a central portion of the body 210. In this simple damper design, a single circular orifice or opening 224 is provided in one of the sidewalls 222 so as to provide a passageway for fluid into and out of the inner chamber 220. The diameter (or size) of the orifice 224 defines the rate at which fluid can be expelled during compression of the body 210, thereby defining, in part, a damping coefficient for the damper 200. The chamber 220 is defined by the exterior sidewalls 222 of the body 210. The cross-sectional shape of the chamber 220 is rectangular with a uniform chamber width, $W_C$, chamber length, $L_C$, and chamber height, $H_C$, with the illustrated chamber 220 being defined with a shape and size by the inner surfaces of the sidewalls 222, i.e., the body 210 is a hollow rectangular vessel with the thicknesses of the sidewalls 222 and exterior dimensions of the sidewalls defining the size and of the inner chamber 220 and, hence, the maximum volume of fluid that can be received in the damper 200.

In use, the side of the body 210 with the orifice 224 may be the bottom side (or one of the vertical or lateral sides) that is positioned facing downward into the body of fluid (e.g., water), and the body 210 is submerged so as to allow water to enter and fill (or at least partially fill) the chamber 220. In use, a boat would directly contact a side of the body 210 adjacent the side with the orifice 224 to the inner chamber 220 or indirectly provide such contact such as via another damper (damper 200 or a damper of another design such as one of dampers 300, 400, or 500). This provides a compressive force that causes the body 210 to deform and collapse (wholly or partially) the chamber 220 (e.g., force opposite sidewalls 222 into abutting contact), and this chamber collapsing forces water in the chamber 220 to be ejected out via the orifice/opening 224. When the force is removed, the body 210 returns to the at-rest or first state shown in FIG. 2. The amount of force required to cause this collapsing of the chamber 220 is based on the size (or volume) of the chamber 220, the volume of water in the chamber 220 at the time of docking by the boat, and other parameters of the body 210 such as its size, shape, and material and thickness of the sidewalls 220. This compressive force can be calculated/predicted and used to rate the damper 200 for its damping ability, which can then be used to design a damper system that includes one or more of the dampers 200.

Figure 3:
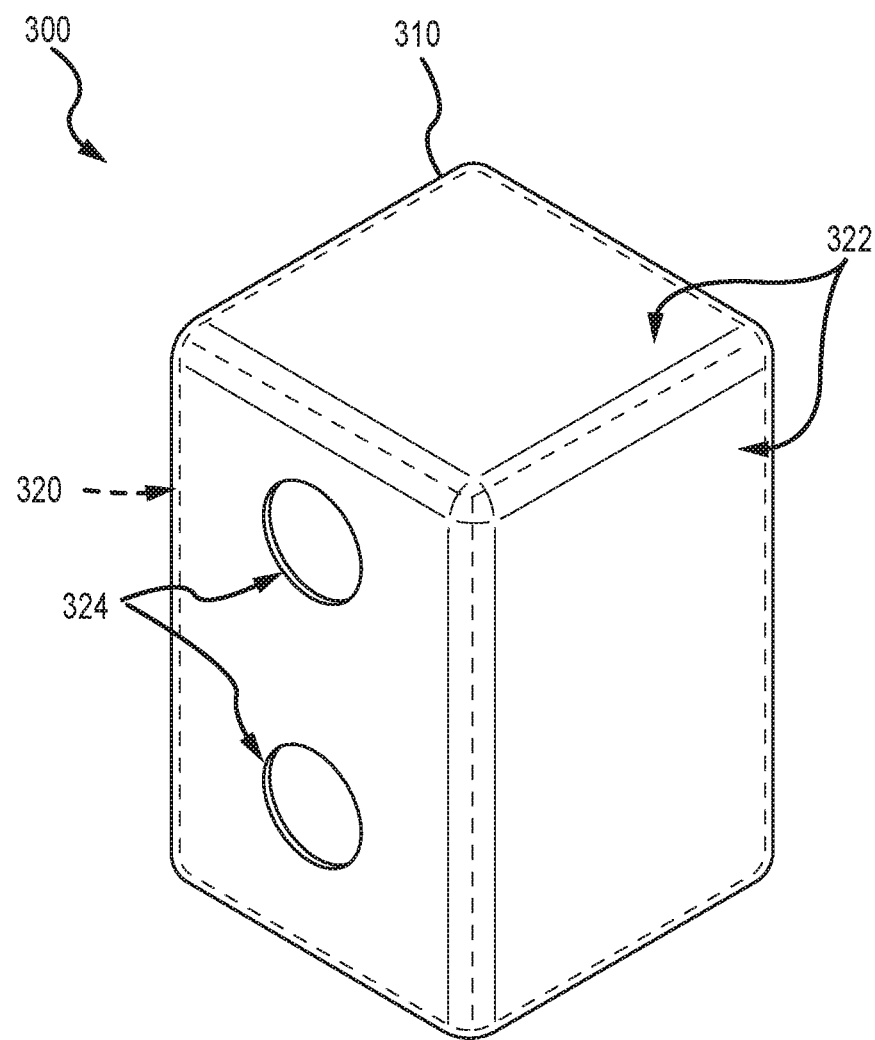

In FIG. 3, a damper 300 is shown that also has a rectangular body 310, but the damper 300 differs in configuration from damper 200 in that it includes two orifices 324 rather than a single orifice 224. Particularly, the damper 300 includes a pair of spaced-apart, cylindrically-shaped or circular orifices or openings 324 on one of the exterior sidewalls 322 of the body 310. With reference to the inner chamber 320, it can be seen that the rectangular-shaped chamber 320 is defined by inner surfaces of the sidewalls 322 to have a volume or size substantially matching that of the exterior dimensions of the body 310 less the thickness of the sidewalls 322. The only fluid passageways to the inner chamber 320 are provided by the two orifices/openings 324.

In use, the body 310 would be positioned with the orifices 324 facing downward into the body of water or other fluid (or at least on a sidewall that is submerged below the water level of the body of water) to allow the fluid to enter and fill the chamber 320 through the orifices 324. The use of two orifices/openings 324 as passageways for fluid in and out of the inner chamber 320 affects the flow rates of a volume of water received within the body 310 and the magnitude of the compressive force required to compress the body 310 and force the water out of the inner chamber 320 via orifices 324.

For example, if the orifices 324 were the same size as the orifice 224 of the damper 200 while the inner chambers 220 and 320 were the same size (held the same fluid volume), it is likely that less compressive force would be required to compress the body 310 of damper 300 than to compress the body 210 of damper 200 (e.g., assuming similar body sizes, shapes, and materials) as the fluid could more readily pass through two like sized/shaped orifices 324 than one 224. However, if the orifices 324 are smaller in diameter than the orifice 224 the compressive force may be similar or may only be somewhat reduced (e.g., reduces by 10 to 45 percent rather than by about 50 percent if the cumulative passageway size is doubled).

As discussed above, the use of differing patterns, sizes, and/or shapes of orifices in a sidewall of a damper provides a predictable (i.e., design can be modeled and/or tested) damping capacity or functionality for each the dampers 200 and 300, and these dampers can be sized to provide an inner chamber with a known volume, can be fabricated of a particular flexible material with wall thicknesses, and can be provided with a pattern of one to many orifices to provide a damper with a particular damping coefficient (or that requires a particular force to compress in a predicted manner). Such dampers can then be arranged on a dock individually or, more typically, in damper systems/assemblies to achieve a desired damping arrangement.

Figure 4:
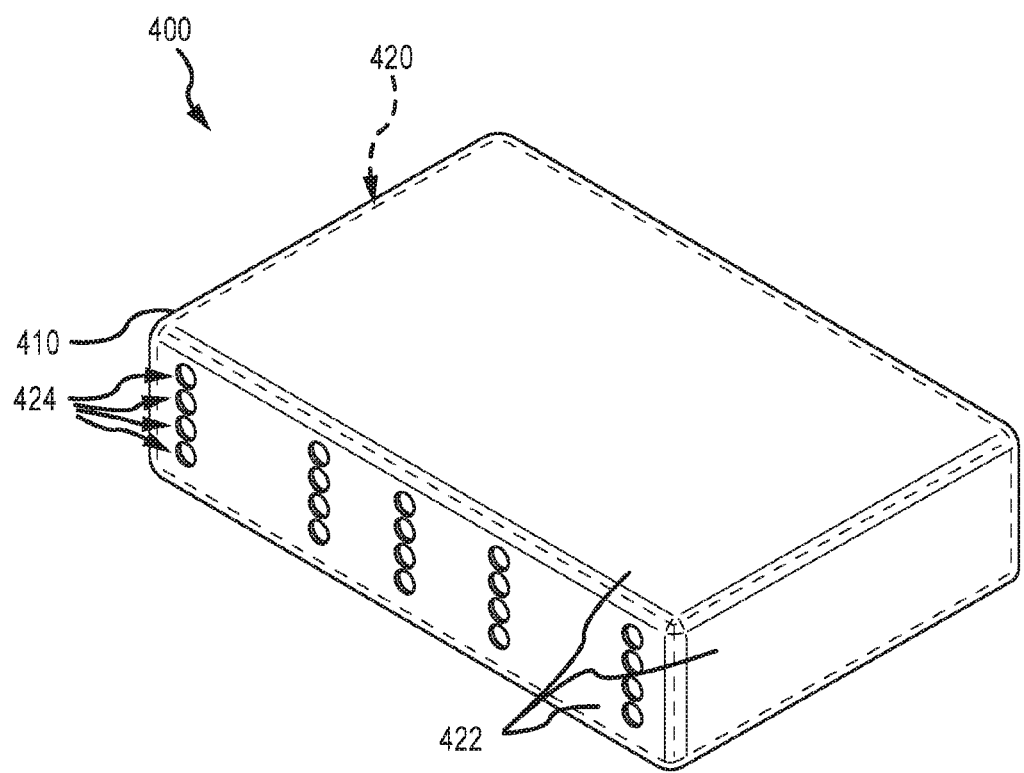

In FIG. 4, a damper 400 is shown that includes a plurality (i.e., 20 in this example) of orifices/openings 424 through one of the exterior sidewalls 422 of its body 410. Each orifice 424 may be defined as a cylindrically-shaped passageway into a rectangular inner chamber 420 that has a width, a length, and a height about equal to the outer dimensions of the body 410. The sidewalls 422 again are formed of a flexible material such as a plastic, rubber and/or plastic-coated fabric, or the like to allow the body to be compressed and to resiliently regain its at-rest state (and refill the chamber 420 with a fluid from a surrounding body of water via the orifices 424 in sidewall 422). The use of smaller diameter/width orifices 424 in the shown pattern (or other patterns not shown), along with the differently shaped and/or sized body 410, can be used by a designer of a damper or damper system to tune or selectively define the compressive force required to force water or other fluid from the body 410 through the orifices 424 (e.g., to define a damping coefficient for the damper 400 that may differ from those of dampers 200 and 300 (be greater or smaller depending on the need in a damper system)).

Figure 5:
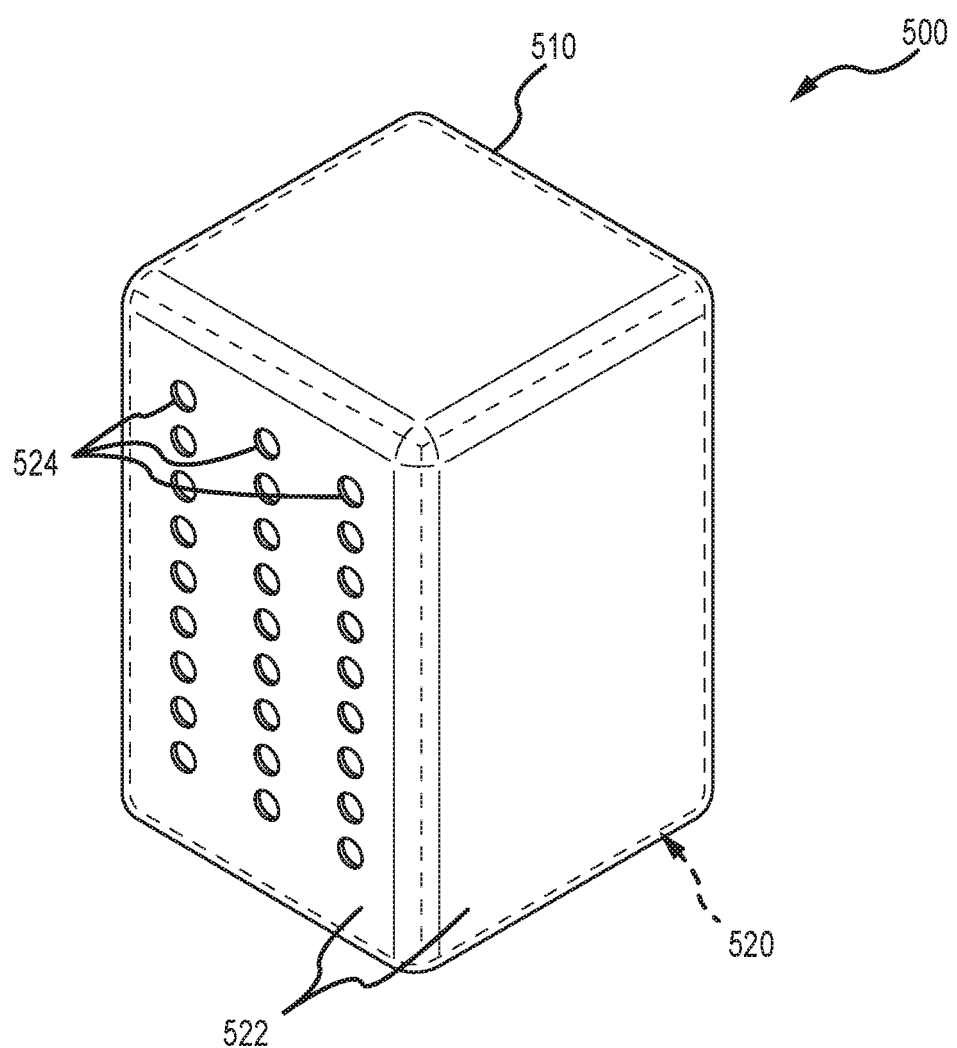

FIG. 5 illustrates another exemplary damper 500 that, like damper 400, includes a body 510 with exterior sidewalls 522 defining a rectangular-shaped inner chamber 520 (e.g., the body 510 is a hollow vessel). The sidewalls 522 are formed of a flexible material such as a plastic or a rubber/plastic-coated fabric with their at-rest (or without compression) shape shown in FIG. 5. One of the sidewalls 522 includes a plurality of circular orifices 524 extending through the thickness of the sidewall 522 to provide fluid passageways into and out of the inner chamber 520. The orifices 524 are arranged in three rows (but other embodiments may arrange the orifices 524 in differing patterns). Again, the size, number, and arrangement of the orifices 524 on the sidewall (or sidewalls) 522 of the body 510 (along with other damper parameters such as wall thickness, materials used to form walls 522, body shape and size, and the like) determine the compressive force that would have to be applied to force fluid (e.g., water) from the body 510 from the chamber 520 through the orifices 524. This compressive force can be determined and tuned (e.g., by increasing/decreasing the number or size or pattern of the orifices, by changing the size or shape of the body 510, by changing the materials and/or thickness of the walls 522, or the like) to provide a damper 500 with a desired "rating" or damping ability for use in a damper system.

Figure 6A:
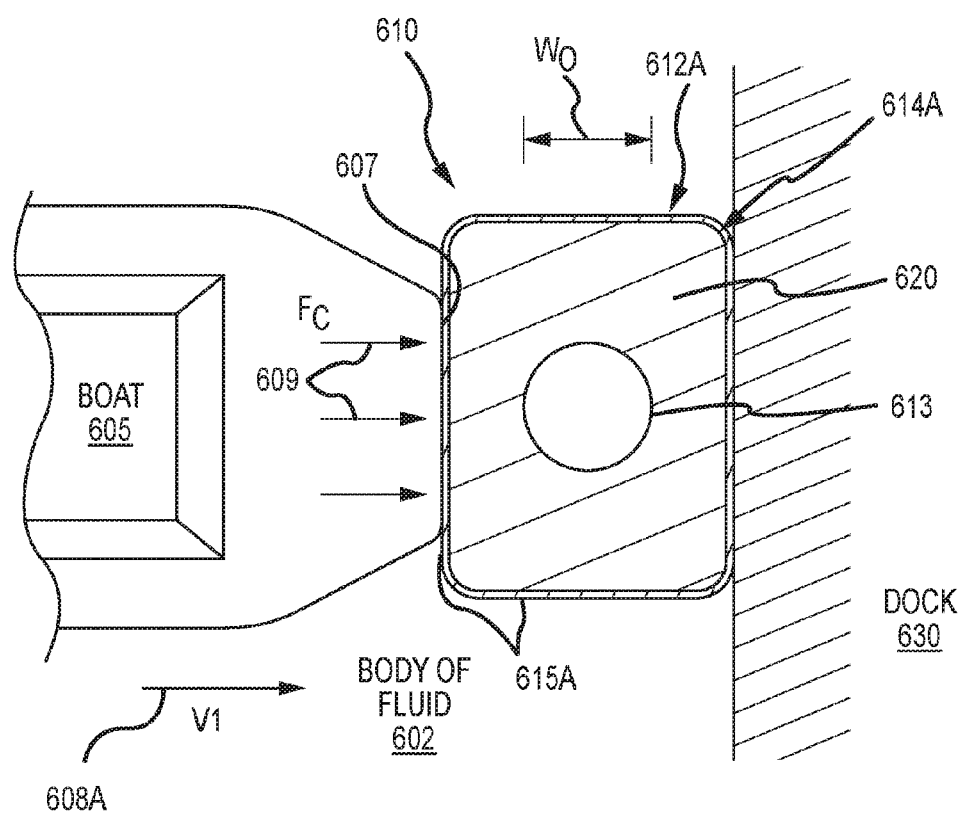
FIGS. 6A-6C illustrates a damper of the present description in use to dampen a collision of a boat with a dock.
Figure 6B:
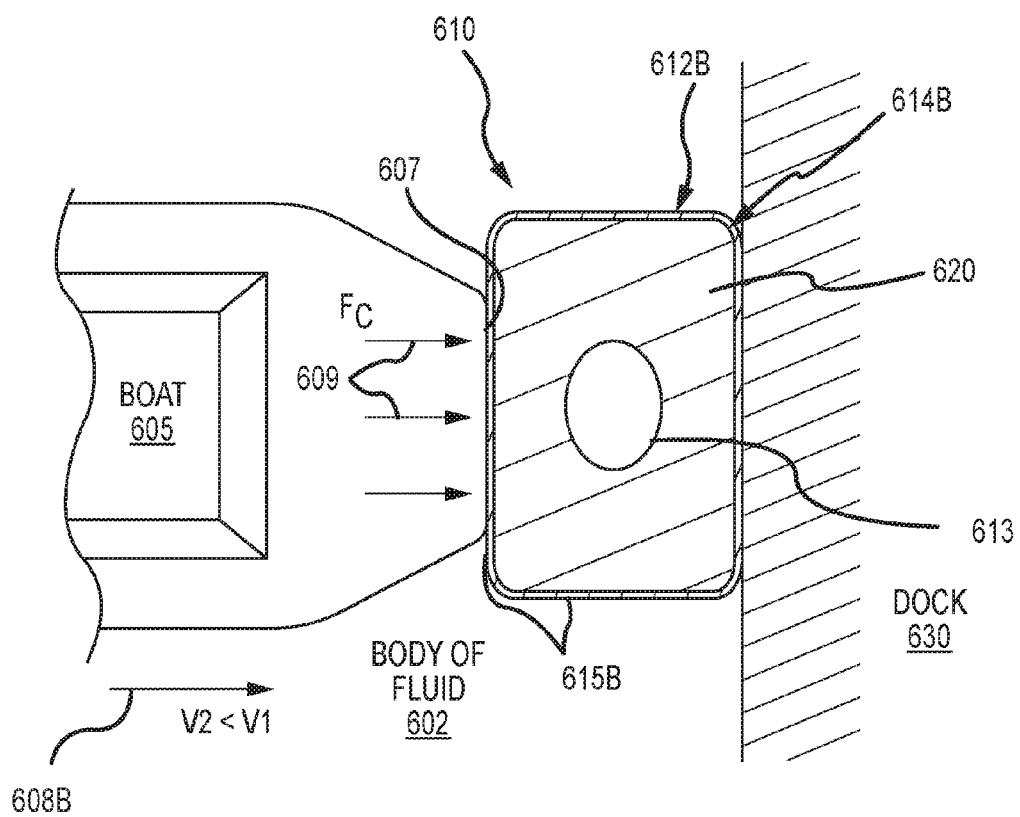
Figure 6C:
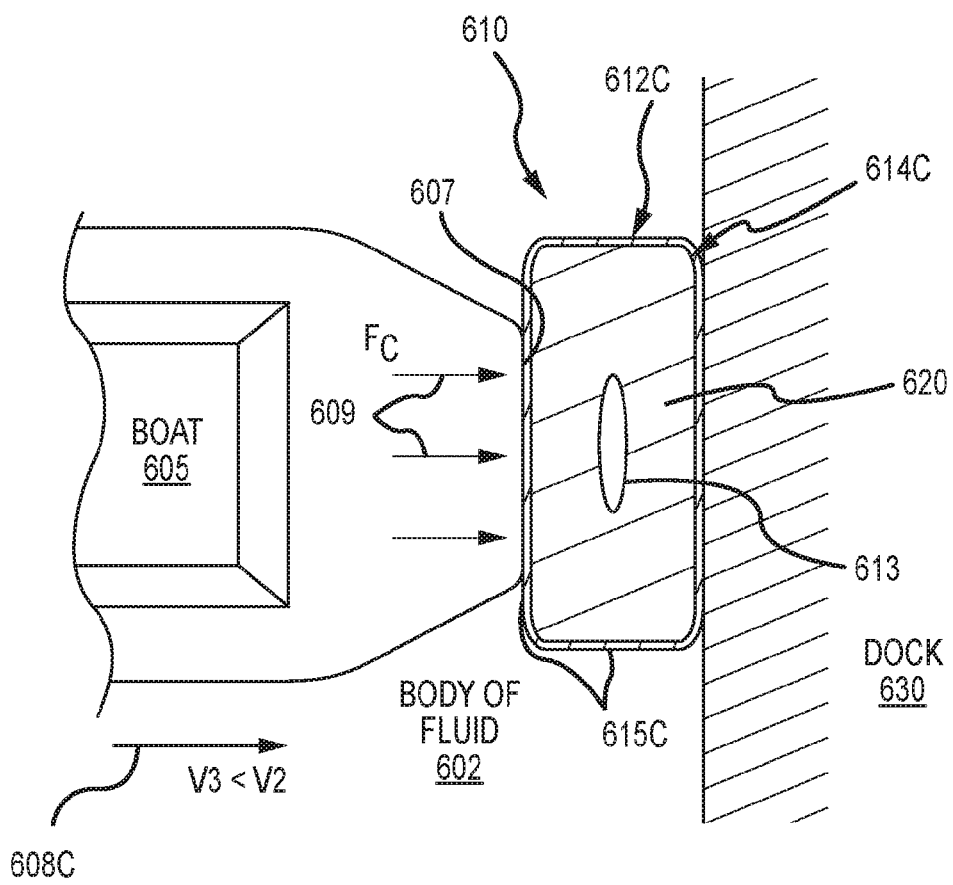

FIGS. 6A-6C illustrate a cross-sectional view of a damper 610 during its use to dampen the collision between a boat 605 and a dock 630. In FIG. 6A, the damper 610 is shown with its body 612A to be in a first or "at-rest" state (or pre-collision state). The body 612A is attached on a first side to a dock 630 and leading edge/side 607 of the boat 605 is approaching or initiating contact with a second, opposite side of the body 612A to apply a compressive force, $F_C$, as shown with arrows 609 to the damper body 612A. An inner chamber 614A is provided in the center of the body 612A and is defined to have a rectangular cross-section by the inner surfaces of sidewall(s) 615A. A single orifice 613 with a width/diameter, $W_O$, is provided in a sidewall 615A (positioned to face "down" or into the body of fluid 602 as shown in FIG. 6A). The damper 610 is submerged in the body of fluid 602, and, in the at-rest state shown in FIG. 6A, a volume of fluid 620 is contained within the chamber 614A.

In FIG. 6A, the boat 605 is shown to be traveling at a first velocity, $V_1$, with arrow 608A toward the damper 610. In FIG. 6B, the boat 605 has come fully into contact with the outer-facing side of the damper body 612B and is applying the compressive force, $F_C$, with its leading edge/side 607. This deforms the body 612B to be in a second state (partially compressed state) with the sidewall 615B collapsing, which causes the chamber 614B to contain a second volume of the fluid 620 that is smaller than the volume of fluid 620 in the inner chamber 614A in the first state (i.e., collapsing the inner chamber 614B forces a portion or fraction of the fluid 620 out of an orifice or open end 613 of the inner chamber 614B and out of the body 612B of the damper 610). Energy has been converted from the kinetic energy of the boat 605 to frictional losses of the damper 610 between the two states shown in FIGS. 6A and 6B, and this results in the boat 605 traveling at a second velocity, $V_2$, shown with arrow 608B that is slower than the first velocity, $V_1$.

Further, FIG. 6C shows the damper 610 at a third time or in a third state in which the inertia of the boat 605 continues to apply a compressive force, $F_C$ (shown by arrows 609) at the boat's edge/side 607 to the body 612C of the damper 610 such that the chamber's sidewall 615C have been further elastically deformed to fully or nearly fully collapse the chamber 614C. As a result, all or nearly all the fluid 620 has been forced from the inner chamber 614C via the orifice 613 at one end of the chamber 614C. Additional kinetic energy from the boat 605 has been converted by the damper 610 into frictional losses such that it is slowed further to be moving at a third velocity, $V_3$, as shown with arrow 608C that is slower than the second velocity, $V_2$. In an exemplary embodiment, the third velocity, $V_3$, would be zero. This damping process is reversible because when the boat 605 moves away from the dock 630 and the damper 610 the body 612C which is formed of a flexible material will return to the partially compressed or second state 612B and then the at-rest or first state 612A, and the fluid 620 from the surrounding body of fluid 602 will be drawn back into the inner chamber 614A, 614B, and 614C via the orifice 613 in one of the sidewalls of the damper body. The amount of compression can be labeled as the "stroke" or "cycle" of the damper or of a damper assembly.

The basis of the damper design allows damper systems to be configured by combining several of the individual dampers. Using this methodology, one can create a specific cushioning performance and control docking operations such as by controlling rate of deceleration of a boat and distance traveled by the boat after it initially contacts the damper system (e.g., the amount of stroke or a cycle of the damper system). Some damper systems can even be used to steer or guide the boat along a path defined by the damper system. Each damper body in a damper system may take a similar shape to provide a system's building block (e.g., a rectangular body, a cylindrical body, and the like), and the one basic building block can be stacked in parallel and/or series (e.g., in one, two, three, or more rows of dampers).

Performance of the damper system (e.g., deceleration rate, distance of travel during damper body compression, and the like) can be adjusted or tuned by choosing the size, shape, number, and pattern of the orifices provided in one or more sidewalls of each damper body or in each building block. As discussed above, the damper bodies or blocks can contain various sizes and quantities of orifices leading to the damper body inner chamber to allow the fluid to be drawn into the chambers, and these orifice numbers, sizes, and patterns can in combination change the damping forces provided by the dampers and, hence, the overall damper system. This allows the designer using the dampers described herein to design damper systems with varying damping coefficients, thereby creating predictable forces for restraining/receiving an approaching or docking boat. By arranging dampers of varying design in a system/assembly (in parallel and/or series), deceleration of a boat landing at a dock can be effectively and accurately controlled.

Figure 7:
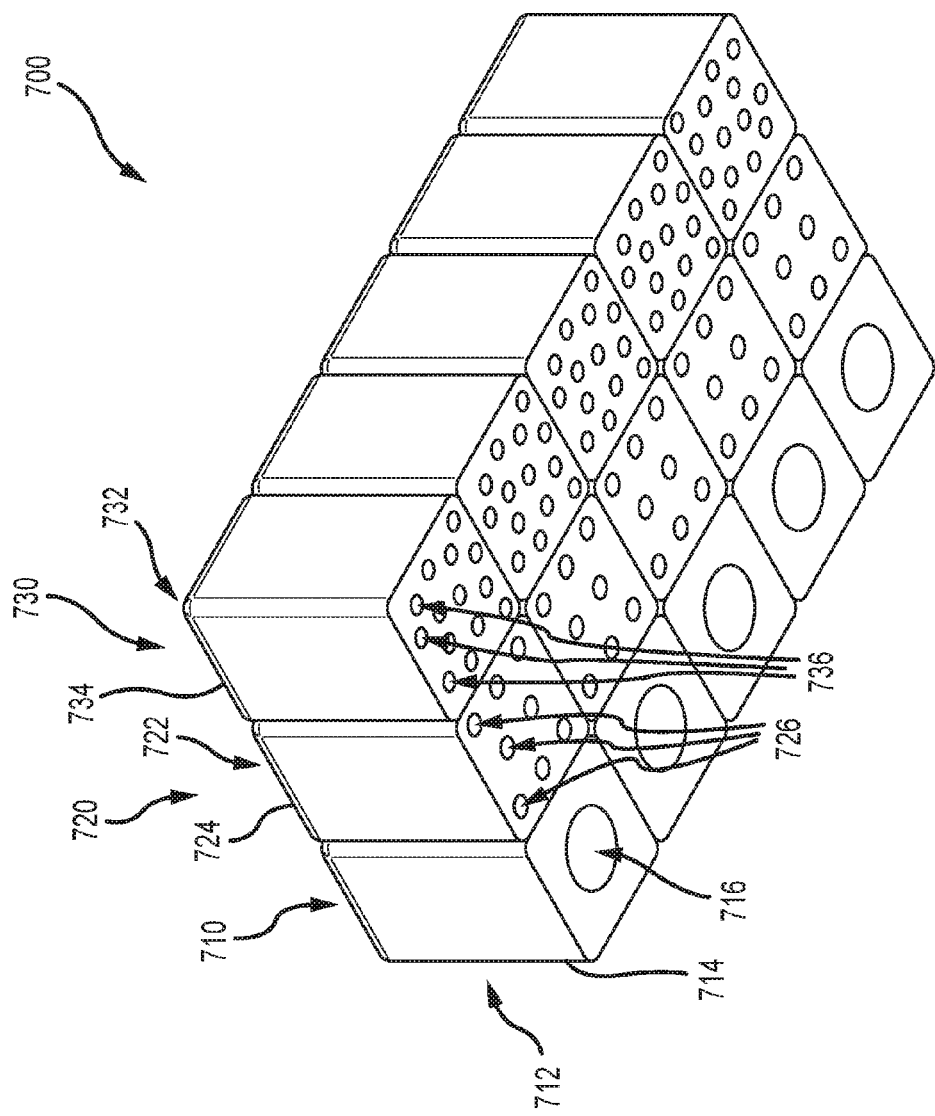
FIG. 7 illustrates a damper system of one embodiment of the present description that may be attached to a dock to control docking of a boat.

FIG. 7 illustrates an exemplary damper system or assembly 700 that may be attached to a dock for controlling landing/docking operations for a boat. The system 700 is shown with a bottom perspective view (upward looking view) such as often would be the case when the system 700 is attached to a dock (not shown). The system 700 includes three rows 710, 720, and 730 of dampers, with each row including a differently designed damper, and the row 730 may be the outer or boat-contacting row in some cases (with row 710 being the inner or dock-mating row) while in other cases it may be useful to have row 710 be the outer or boat-contacting row (with row 730 being the inner or dock-mating row). Each row 710, 720, 730 is made up of a plurality of dampers 712, 722, 732 that would have different damping performance ratings, i.e., damping coefficients (amount of force required to compress the damper from its first/at-rest state to the second/wholly (or nearly wholly) compressed state), rate of deceleration provided by each damper, and overall distance traveled by a boat (which would be defined by the combination of the dampers in the system 700).

The system 700 provides an example of dampers or damper blocks 712, 722, 732 arranged in successive rows, with each of the blocks 712, 722, 732 in the rows have differing orifice configurations or patterns to the inner chamber defined by the sidewalls of each of the blocks 712, 722, 732. The orifice configurations/patterns can be selected, tuned, and/or adjusted to achieve a desired damping system (e.g., damping coefficients in each row may differ), with this being possible due to the predictable dynamic behavior of the dampers described herein with chambers filled with incompressible fluid from a body of water near a dock. As shown, the row 710 includes blocks 712 with a rectangular body 714 and a single, relatively large orifice 716 with a circular cross section in one of its sidewalls. With this design, the body 714 will receive (through the orifice 716) a volume of fluid in its inner chamber in its first or at-rest state, and the body 714 will be relatively easy to compress to force the fluid out of the inner chamber through the large orifice 716 such as when a boat contacts the row 710 (each damper is arranged in parallel to each other in the row), which may make the row 710 well-suited for initial contact with a boat (i.e., for use as an outer row) as deceleration is provided at a lower initial rate to reduce the jarring impact of the boat with the dock via the system 700.

The system 700 further includes a second or middle row 720 of dampers 722 each with rectangular-shaped body 724, which may be the same size and shape as the body 714 of row 710 with a like-sized inner chamber size/volume. Use of like shaped/sized damper bodies 714 facilitates arrangement of dampers in parallel (e.g., mating rows of parallel dampers together in the system 700 or "stacking" of dampers in a system 700). The body 724 includes a plurality of cylindrically-shaped orifices 726 in one of the body's sidewalls, and each of these orifices 716 is smaller in diameter/width than the orifice 716 of the block 712. The number of orifices/openings 726 may be nearly any number as may be the location pattern such as 2 to 12 with 8 chambers being shown in FIG. 7.

The number, size, and location pattern of the orifices 726 may be chosen to achieve a damper 722 with a particular damping coefficient or operating parameters. For example, the damper 722 may be configured as shown to require more compressive forces to be applied (e.g., by a docking boat) to wholly or nearly wholly compress the body 724 and its inner chamber (to force the contained volume of fluid out the orifices 726) than is required for the like-sized damper 712 in row 710. In this way, the row 720 may more quickly decelerate a boat engaging the system 700 at a greater or faster rate. Further, the amount of travel allowed by the row 720 may be less than the row 710 (e.g., by providing thicker or stiffer sidewalls or, in other cases than shown, by providing a less thick body 724 that may have a smaller inner chamber). The boat was slowed initially from a contact velocity to a second, slower velocity by its compression of the first or outer row, and its compression of the second row 720 causes the boat to further slow from the second velocity to a third, even slower velocity.

Further, the system 700 further includes a third or inner (or outer, in some cases) row 730 of dampers 732 each with rectangular-shaped body 734, which may be the same size and shape as the body 714 of row 710 to facilitate arrangement of dampers in parallel (e.g., mating rows of parallel dampers together in the system 700 or "stacking" of dampers in a system 700). The body 734 includes sidewalls defining a rectangular-shaped inner chamber accessible via a plurality of circular-shaped orifices/openings 736, and each of these is shown to be smaller in diameter/width than the orifices 716 of the blocks 712 and also to be smaller than the orifices 726 of the blocks 722. The number of orifices 736 in the sidewall of each damper body 734 may be nearly any number (and the location pattern may also vary) such as 4 to 20 or more with 14 orifices being shown in FIG. 7.

The number, size, and location pattern may be chosen to achieve a damper 732 with a particular damping coefficient or operating parameters. For example, the damper 732 may be configured as shown to require more compressive forces to be applied (e.g., by a docking boat) to wholly or nearly wholly compress the body 734 to force the contained volume of fluid out of the inner chamber via the orifices 736 than is required for the like-sized damper 722 in row 720. In this way, the row 730 may more quickly decelerate a boat engaging the system 700 at a greater or faster rate than the row 720. Further, the amount of travel allowed by the row 730 may be less than the row 720 (e.g., the thickness of the dampers 732 may be less than the dampers 722 to provide a lower volume/smaller inner chamber for receiving fluid, the sidewalls may be thicker or formed of a less elastic material or the like). The boat was slowed intermediately from a second, slower velocity by its compression of the intermediate/middle or second row, and its compression of the third or inner (or outer, in some cases) row 730 causes the boat to further slow from the third velocity to a fourth velocity (at or near zero to avoid collision with the dock upon which the system 700 is mounted for use).

It will be understood from the description of the various damper block designs and the system 700 of FIG. 7 that the dampers of the present description can be designed to have a wide variety of shapes as well as sizes (e.g., to provide rows of dampers with differing sized inner chambers for receiving differing volumes of fluid in their hollow bodies via the same or differing orifice sizes, numbers, patterns, or the like). The bodies may also be tapered or convoluted (or the single inner chamber of each body may be tapered or convoluted so as to not have a uniform width/diameter along the length of the damper body such as by providing varying wall thicknesses), which can be useful for providing a greater variation of performance such as relative to the stroke or cycling of each damper. The dampers can be designed, for example, to increase or decrease the force required to compress a damper system with the distance traveled by a boat after contact with the damper system as desired (e.g., as the boat sequentially compressed rows of a damper system).

Figure 8:
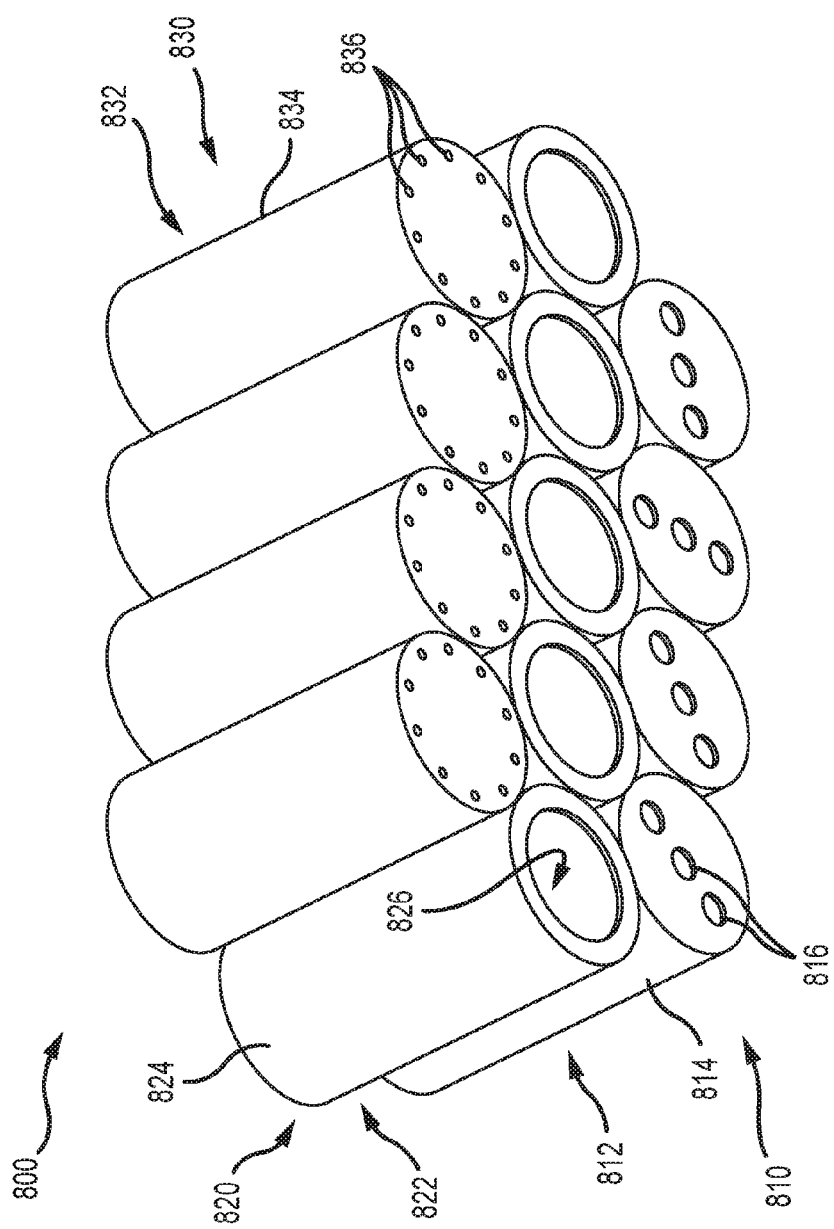
FIG. 8 illustrates another damper system of another embodiment of the present description showing differing body types and off-setting (non-parallel) arrangement of the dampers in each adjacent row.

With these possible variations in mind, FIG. 8 illustrates another embodiment of a damper system 800 that may be applied to a dock to control a boat's landing. The view is again a bottom perspective view (looking upward from the body of fluid in which the system 800 is submerged adjacent dock) showing that the system 800 includes three rows 810, 820, and 830 with three differently designed dampers 812, 822, and 832. Each of the dampers 812, 822, 832 has similarly shaped and sized bodies 814, 824, 834 defined by their exterior sidewalls, which have inner surfaces defining a cylindrical inner chamber (i.e., the bodies 814, 824, 834 are hollow vessels). Instead of being rectangular in shape, each of the bodies 814, 824, 834 is cylindrical shaped, i.e., with circular cross sections that are uniform in this embodiment but in others could be tapered along the length of the body. Row 830 or row 810 may be positioned against the dock so that the other one of the rows 810 or 830 is facing outward into the body of the water near the dock to receive the initial contact from the boat and provide the initial deceleration rate (or damping of the collision with the dock via the system 800). The dampers 812, 822, 832 in the rows 810, 820, 830 are shown to be offset or staggered in contrast to in the system 700 (or are not arranged to be in parallel columns).

As with the system 700, the dampers 812, 822, 832 include like bodies 814, 824, 834 but differing orifices 816, 826, and 836 providing fluid passageways to the inner chamber in each of the bodies 814, 824, 834. Specifically, row 810 includes dampers 812 with bodies 814 with multiple orifices 816 in an end wall or lower sidewall, and the orifices 816 are each circular in shape with a first diameter. The orifices 816 in combination control outward (and inward) flow of fluid from the inner chamber of each body 814 that defines (in part) an amount of compression required to force all (or nearly all) of the received fluid from the inner chamber. The dampers of the row 810 are shown to provide a variance in the orifice pattern orientation relative to each other (i.e., each damper is not arranged in an identical manner with an expected direction of travel of a boat landing at the dock), which may be useful to provide a particular damping performance. Three orifices 816 are shown to the inner chamber in a single sidewall (e.g., an end cap of the cylindrical body 814) but other numbers may be used (e.g., one-to-many) and differing patterns/locations on the one (or more) sidewall of the body 814. With this configuration, the dampers 812 may have a particular damping coefficient (i.e., provide a particular deceleration rate, require a particular force to achieve compression, and so on).

The dampers 822 of the second or middle (or intermediate) row 820 each include a cylindrical body 824 with a single, relatively large in diameter/width orifice 826 in a sidewall/end cap of the body 824. This provides a large passageway to the inner chamber of the body that may make the dampers 822 more easily deformed than the body 814 of the dampers 812 such that less compressive force has to be provided to force water or other incompressible fluid out of the inner chamber via orifice 826. Hence, the second row 820 may provide a slower deceleration rate and begin to compress concurrently with compression of the row 810 (if this row is the outer row) or row 830 (if this row is the outer row). In practice/operation, all rows concurrently compress as the rows are being loaded in series. Every damper in each row and column will compress, but the amount of compression depends on the arrangement and on the damper designs chosen for the damping system.

The dampers 832 of the third or inner (or outer) row 830 each include a cylindrical body 834 with sidewalls defining a cylindrical inner chamber. In an end cap or lower sidewall, a plurality of cylindrically-shaped orifices 836 are provided that may be greater in number than the orifices 816 of dampers 812, but each with a smaller diameter/width. This may result in the dampers 832 of row 830 providing a greater damping coefficient (i.e., require a greater compressive force to deform/compress to force fluid out of the inner chambers via orifices 836 and provide a faster deceleration rate for a boat). In other embodiments, the damper designs within each row may also be varied (e.g., not identical bodies and orifices (and inner chambers) as shown) to tune the system 800 to provide an overall damping performance for a particular dock and particular landing operations.

Figure 9:
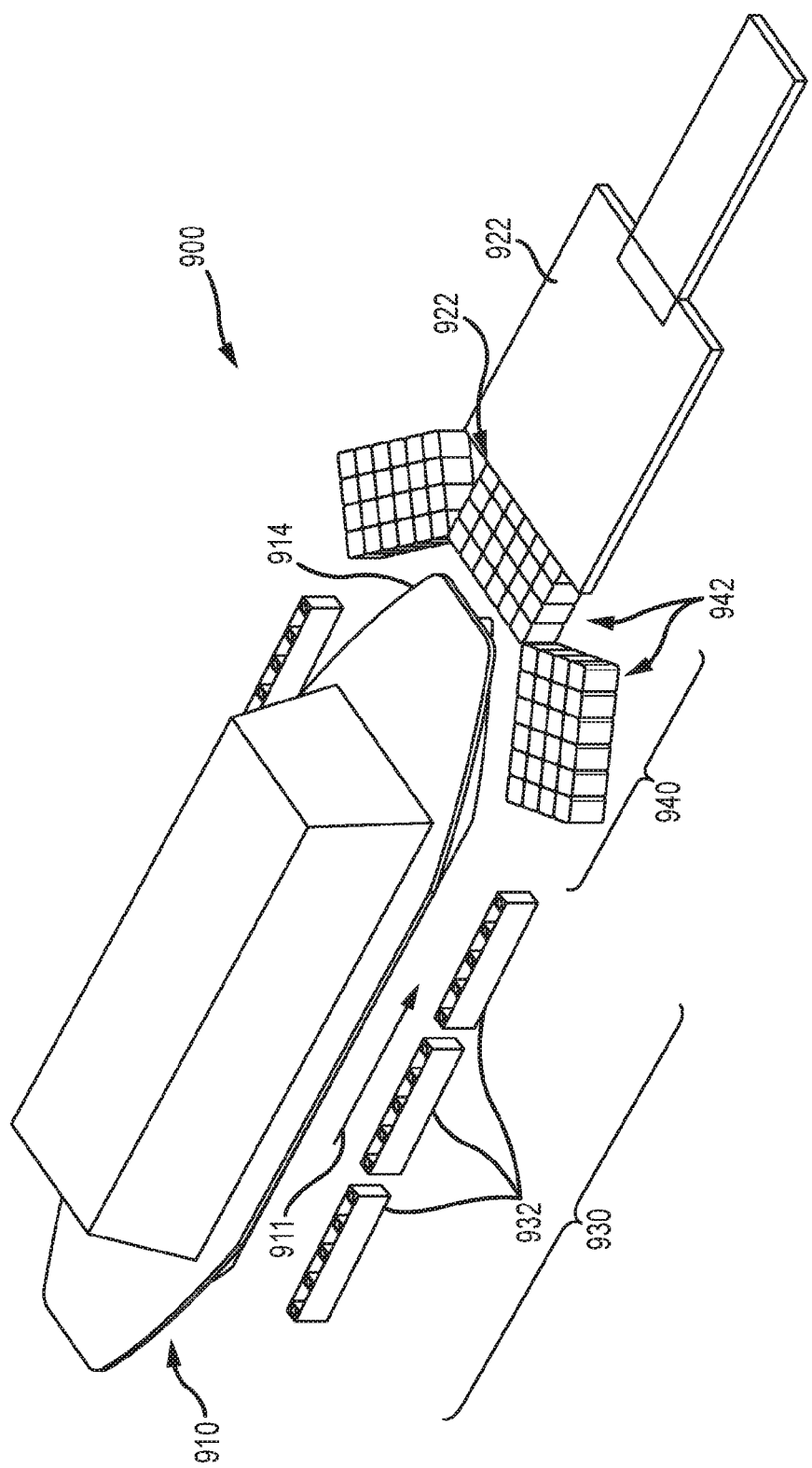
FIG. 9 illustrates a docking system or water navigation system of the present description with assemblies of damper systems arranged on or near a dock to control landing or docking of a boat with the dock.

FIG. 9 illustrates a docking system or water navigation system 900 of the present description with assemblies 930, 940 of damper systems 932, 942 arranged near and on, respectively, a dock 920 to control landing or docking of a boat 910 with the dock 920. In use, a boat 910 is traveling in a particular direction in a range of velocities as shown with arrow 911 with a leading edge or side 914 approaching a dock 920. The docking system 900 includes a first assembly 930 with damping system 932 that is configured to guide the boat 910 towards the dock 920. The assembly 930 may not be contacted unless the boat 910 is off course, and the dampers of each damper system 932 may be included for this type of glancing or "near parallel" collisions.

Further, the docking system 900 further includes a second assembly 940 with damper systems 942, with at least one damper system 942 attached to or proximate to the contact or outer surface 922 of the dock 920 to absorb the collision with the boat 910 rather than the dock 920. As shown, the damper systems 942 may be arranged with one to many rows of dampers or damper "blocks" with the same or, more often, differing designs (e.g., with differing inner chamber sizes/shapes and/or with differing orifices or orifice patterns in each row) so as to provide an increasing damping coefficient with travel of the boat 910 from an initial contact until full compression of the damper system 942 is achieved. Note, in an exemplary embodiment, the boat 910 will have its velocity reduced to zero well before full compression occurs with full compression only experienced in rare circumstances during operation such as upon loss of braking ability.

The system 900 provides one example of a possible dock configuration. The damper blocks described herein are easily configurable to a particular dock surface 922 and available space and geometries. The damper blocks can be arranged in series and/or in parallel with one another and at various angles as shown with damper systems 942 in the second assembly 940 such as to accommodate different hull shapes (or leading edges 914 of such hulls) of a boat 910. The dampers are attached to an edge or surface 922 of a dock in the system 900, but one or more of the damper systems 942 may also be attached to the boat 910 itself such as on leading edge or side 914 of the hull of the boat 910.

Figure 10:
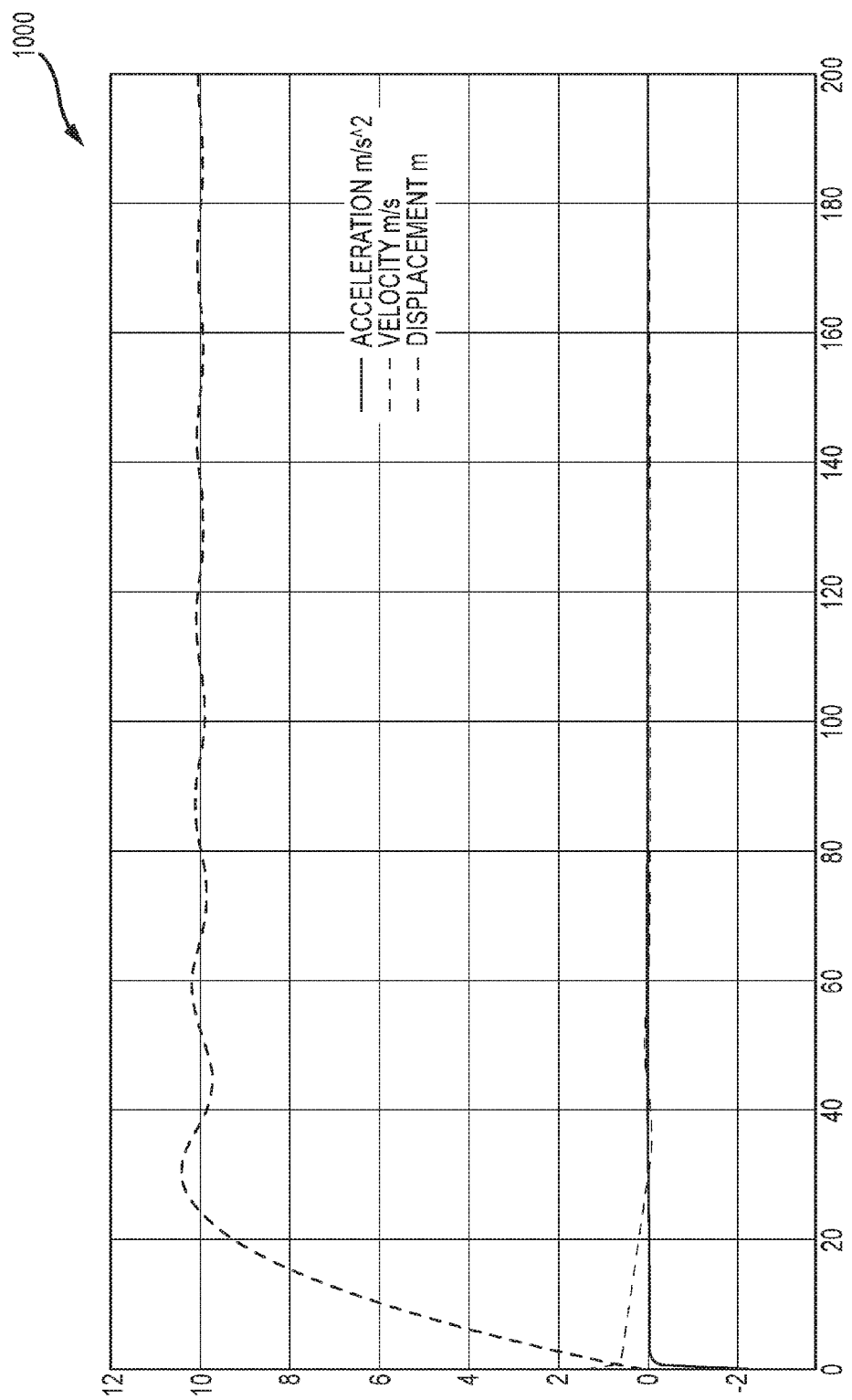
FIG. 10 is a graph showing results of modeling performance of a damper of the present description during docking of a particular boat at a dock upon which the damper is mounted.

To design a damper system, each damper can be chosen based on its expected performance that can be modeled for a particular docking scenario. It may be useful to provide an example simulation or modeling for a damper system with one damper or damper block only. A boat may be approaching a dock's surface with the damper or damper block attached at an initial velocity of 1.5 meters per second. The mass of the boat is known to be 20000 kilograms. The spring rate for the particular damper or damper block may be determined to be 1000 kilograms/meter, the width of the damper is chosen to be 8 meters, and the height of the damper is chosen to be 1.5 meters. The initial depth or thickness of the damper body is chosen to be 5 meters (between the dock and an approaching boat). The sidewalls of the damper define a rectangular inner chamber for receiving fluid. The number of orifices in a sidewall of the damper was chosen to be 50 with each having a cylindrical or circular shape with a width/diameter of 0.5 meters. The modeling can be used to generate the graph 1000 shown in FIG. 10 plotting the displacement of the boat (in meters), velocity of the boat (in meters/second), and the acceleration (meters/seconds squared). The graph 1000 shows that the boat gradually slows down as the damper's chambers are compressed and fluid ejected until the boat stops.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the damper bodies shown and described herein typically included one inner chamber but more than one chamber may be used. In either of these examples, one or more opening or orifice is provided in one of the sidewalls (or two or more sidewalls may be used to provide the orifices) to define a fluid passageway to the inner chamber to receive and expel fluid from the damper. In other embodiments, two ends of the chamber may be open or have orifices on opposite sidewalls to provide flow paths for fluid in which the damper is submerged. In another embodiment, each or some of the orifices may further include a flow control mechanism that is configured to allow flow into the inner chamber as the body moves into its at-rest or non-compressed state to fill the inner chamber. Then, this same (or a different) flow control mechanism may reduce or control flow out of the inner chamber via the orifice upon compression to further define and/or tune the damping coefficient provided by each damper.

From the above description, it should be recognized that each damper may be considered a spring damper, and the systems with two or more dampers may be thought of as spring damper systems. Each damper includes one or more orifices to an inner chamber in one or more of its sidewalls, and the geometry of each of these orifices defines, in part, the damping functionality of the damper. Further, the sidewalls of the dampers used to define the inner chamber(s) are formed of a material that is bendable but not stretchable (i.e., no elastic tensile deformation is desired) and that also has a high tensile strength to hold pressure without plastically deforming. Additionally, each damper acts like a spring in resisting compression and in returning to its at rest state after compression and removal of compressive forces (which typically results in refilling of the inner chamber with incompressible fluid via the one or more orifices).

Figure 11:
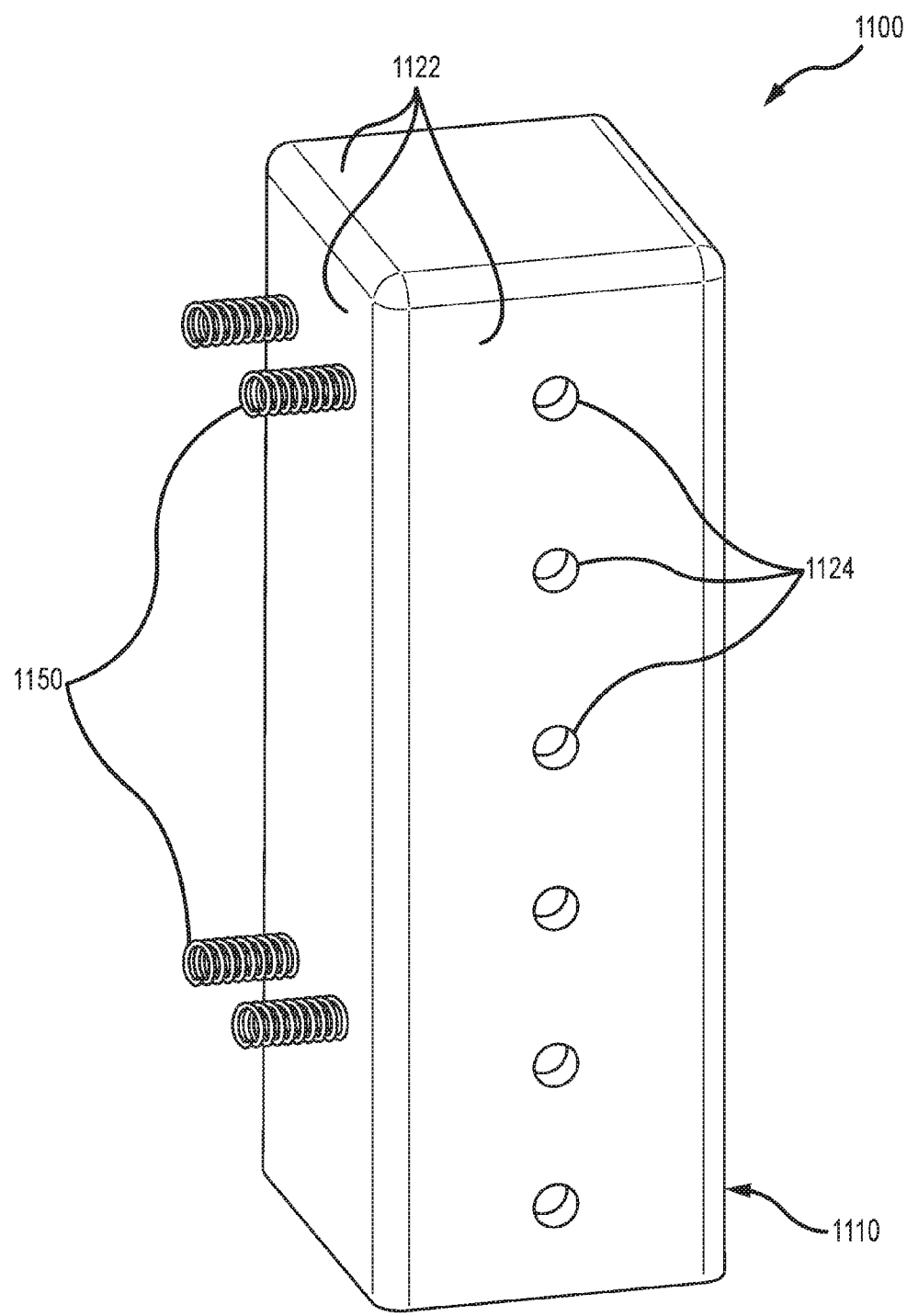
FIGS. 11 and 12 illustrate exemplary dampers, respectively, that include physical springs.
Figure 12:
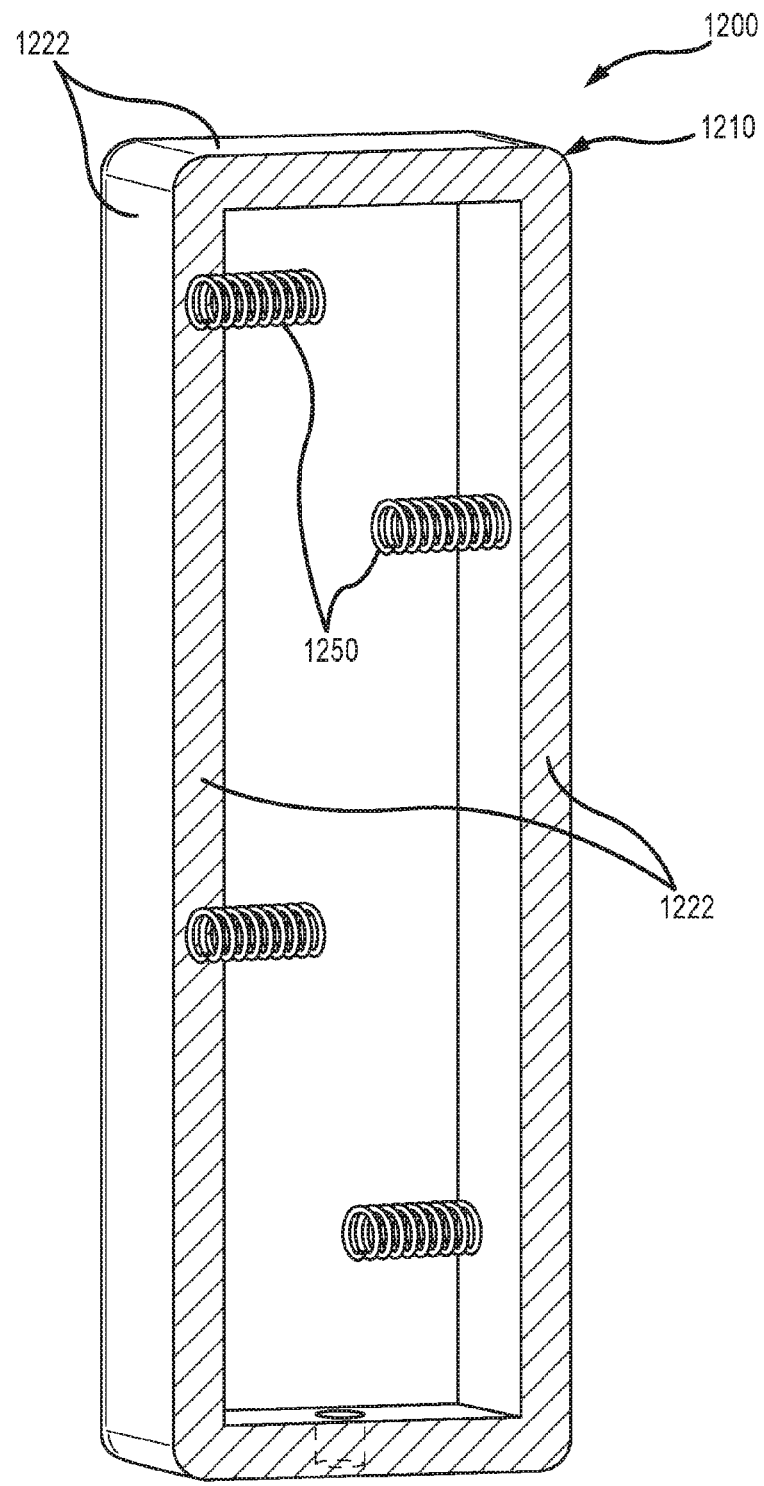

The "spring" of each damper may be provided solely by the sidewalls and the materials used to form the sidewalls. In other embodiments, though, one or more physical springs (e.g., a leaf spring, a coil spring, or the like) formed of a metal, a hard plastic, or other material may be provided on an exterior surface and/or an inner surface of one or more of the sidewalls to resist compression beyond some predefined amount and/or to assist in returning the damper's body to its at rest state post-compression. FIGS. 11 and 12 illustrate exemplary dampers 1100 and 1200, respectively, that include physical springs that add to or increase the reaction force provided by such dampers (as compared to use of only the sidewall materials).

In FIG. 11, the damper 1100 has a rectangular body 1110 with an inner chamber (not shown) for receiving a volume of incompressible fluid through orifices 1124. The body 1110 is formed with a set of exterior sidewalls 1122, and the orifices 1124 are circular in shape and provided in one of the sidewalls 1122 as shown. On an exterior surface of another sidewall 1122, a set of four springs 1150 is provided, with four coil springs arranged in two pairs being shown for contacting an adjacent surface (such as a boat, another damper, a dock, or the like). Coil springs are shown but a wide variety of other spring types may be utilized to implement the damper 1100. The size, number, material, and other physical parameters can be chosen to obtain a desired overall spring damping with the damper 1100 when used alone or in conjunction with other dampers of similar or differing design.

In FIG. 12 (a sectional view), the damper 1200 is also shown to have a rectangular body 1210 with an inner chamber for receiving a volume of incompressible fluid through orifices (not shown). The body 1210 is formed with a set of exterior sidewalls 1222. One or more orifices can be provided in one of the sidewalls 1222 (such as a wall removed in the cross sectional view to expose the inner chamber). On an interior surface of this or another sidewall 1222, a set of four springs 1250 are provided, with four coil springs arranged in two pairs being shown for contacting inner surfaces of opposite sidewalls 1222 when the body 1210 is compressed. Coil springs are shown but a wide variety of other spring types may be utilized to implement the damper 1200. The size, number, material, and other physical parameters can be chosen to obtain a desired overall spring damping with the damper 1200 when used alone or in conjunction with other dampers of similar or differing design.

We claim:

1. A water navigation system for controlling docking a boat in a body of water, comprising:
    a dock with a surface proximate to the body of water; and
    a damper submerged in the body of water and positioned against the surface of the dock,
    wherein the damper includes a body formed of a flexible material,
    wherein the body includes a chamber and at least one orifice in the body defining a passageway to the chamber that is open to the body of water, whereby the chamber receives and contains a volume of the water when the body is in a non-compressed state,
    wherein a portion of the volume of the water is discharged from the chamber through the orifice when the body is deformed under compressive forces from the non-compressed state to a compressed state,
    wherein the water navigation system further comprises a second damper with a second body with an outer shape and size matching the body of the damper, and
    wherein the second body includes an inner chamber and two or more orifices defining passageways to the chamber that is open to the body of water allow flow of the water from the body of water at a different flow rate than through the orifice of the body of the damper, whereby the compressive forces required to deform the damper differ from compressive forces required to deform the second damper.

2. The system of claim 1, wherein the body and the chamber are cylindrically shaped with the orifice being provided on a bottom side of the body.

3. The system of claim 1, wherein the second damper is positioned adjacent the damper and to abut the surface of the dock.

4. The system of claim 1, wherein the second damper is positioned apart from the surface of the dock with the damper sandwiched between surface of the dock and the second damper.

5. A damper system for use in controlling landing of a boat at a dock, comprising:
    a first set of dampers; and
    a second set of dampers,
    wherein each of the dampers in the first set of dampers comprises a body, formed of a first flexible material, with an inner chamber defined by exterior sidewalls of the body and with an orifice providing a passageway through the exterior sidewalls to the inner chamber for receiving a first volume of fluid when the body is in an at-rest state;
    wherein each of the dampers in the second set of dampers comprises a body formed of a second flexible material, with an inner chamber defined by exterior sidewalls of the body and with an orifice providing a passageway through the exterior sidewalls to the inner chamber for receiving a second volume of fluid that differs from the first volume of fluid when the body is in an at-rest state,
    wherein each of the dampers in the first set of dampers has a first damping coefficient, and
    wherein each of the dampers in the second set of dampers has a second damping coefficient differing from the first damping coefficient.

6. The damper system of claim 5, wherein the first and second sets of dampers are arranged in first and second adjacent and abutting rows, whereby one of the first and second adjacent and abutting rows is positionable against a surface of the dock and another one of the first and second adjacent and abutting rows is spaced apart from the dock for receiving the boat during the landing.

7. The damper system of claim 5, wherein the bodies of the first and second sets of dampers have matching outer shapes and sizes.

8. The damper system of claim 7, wherein the outer shapes are either rectangular or cylindrical.

9. The damper system of claim 5, wherein the orifices of the dampers of the first set of dampers are circular in shape with a first diameter and wherein the orifices of the dampers in the second set of dampers are circular in shape with a second diameter differing from the first diameter.

10. The damper system of claim 9, wherein the dampers in the second set of orifices include at least two or more additional orifices providing additional passageways through the sidewalls to the inner chamber.

11. The damper system of claim 5, wherein each of the dampers in the first set of dampers is configured, when under a first predefined compressive force, to be deformed from the at-rest state with the first volume of the fluid in the at least one chamber to a compressed state in which at least a fraction of the first volume of the fluid is ejected from the at least one chamber via the orifice, and
    wherein each of the dampers in the second set of dampers is configured, when under a second predefined compressive force differing from the first predefined compressive force, to be deformed from the at-rest state with the second volume of the fluid in the at least one chamber to a compressed state in which at least a fraction of the second volume of the fluid is ejected from the at least one chamber via the orifice.

12. The damper system of claim 11, wherein the fractions of the first and second volumes of the fluid being ejected is in the range of 9/10 to 10/10.

13. The damper system of claim 5, wherein each of the dampers in the first set of dampers is configured to be deformed from the at-rest state to a compressed state, whereby a depth of the body of each of the dampers in the first set of dampers is reduced by a first predefined magnitude, and
    wherein each of the dampers in the second set of dampers is configured to be deformed from the at-rest state to a compressed state, whereby a depth of the body of each of the dampers in the second set of dampers is reduced by a second predefined magnitude differing from the first predefined magnitude, whereby a maximum amount of travel for the boat after initial contact with the damper system is defined by a combination of the first and second predefined magnitudes.

14. A system for damping impact of a moving object with a stationary object, comprising:

a first row of dampers each comprising a flexible body with an inner chamber defined by exterior sidewalls of the flexible body, wherein one of the sidewalls includes one or more orifices each providing a fluid passageway into the inner chamber, whereby the inner chamber is adapted to receive a first volume of fluid when the flexible body is in a non-compressed state and to expel the fluid as the flexible body is compressed into a compressed state; and a second row of dampers positioned to be parallel and abutting the first row of dampers, each of the dampers in the second row of dampers comprising a flexible body with an inner chamber defined by exterior sidewalls of the flexible body, wherein one of the sidewalls includes one or more orifices each providing a fluid passageway into the inner chamber, whereby the inner chamber is adapted to receive a second volume of fluid when the flexible body is in a non-compressed state and to expel the fluid as the flexible body is compressed into a compressed state, wherein the inner chambers of the dampers in the first row each has a first volume and the inner chambers of the dampers in the second row each has a second volume matching that of the first volume, wherein the one or more orifices of the dampers of the first row have a size, a number, or orientation pattern that differs from the one or more of the orifices of the dampers in the second row, wherein each of the dampers in the first row of dampers has a first damping coefficient and each of the dampers in the second row of dampers has a second damping coefficient, and wherein the second damping coefficient is greater than the first damping coefficient.

15. The system of claim 14, wherein the size of the orifices in the dampers of the first row is greater than the size of the orifices in the second row.

16. The system of claim 14, wherein the number of the orifices in the dampers of the second row is greater than the number of the orifices in the dampers of the first row.

17. The system of claim 14, wherein the flexible bodies of the dampers in the first and second rows are all in rectangular in shape or are all cylindrical in shape.

18. A damper system for use in controlling landing of a boat at a dock, comprising:

a first set of dampers; and a second set of dampers, wherein each of the dampers in the first set of dampers comprises a body, formed of a first flexible material, with an inner chamber defined by exterior sidewalls of the body and with an orifice providing a passageway through the exterior sidewalls to the inner chamber for receiving a first volume of fluid when the body is in an at-rest state, wherein each of the dampers in the second set of dampers comprises a body formed of a second flexible material, with an inner chamber defined by exterior sidewalls of the body and with an orifice providing a passageway through the exterior sidewalls to the inner chamber for receiving a second volume of fluid that differs from the first volume of fluid when the body is in an at-rest state, wherein each of the dampers in the first set of dampers is configured, when under a first predefined compressive force, to be deformed from the at-rest state with the first volume of the fluid in the at least one chamber to a compressed state in which at least a fraction of the first volume of the fluid is ejected from the at least one chamber via the orifice, and wherein each of the dampers in the second set of dampers is configured, when under a second predefined compressive force differing from the first predefined compressive force, to be deformed from the at-rest state with the second volume of the fluid in the at least one chamber to a compressed state in which at least a fraction of the second volume of the fluid is ejected from the at least one chamber via the orifice.

19. The damper system of claim 18, wherein the first and second sets of dampers are arranged in first and second adjacent and abutting rows, whereby one of the first and second adjacent and abutting rows is positionable against a surface of the dock and another one of the first and second adjacent and abutting rows is spaced apart from the dock for receiving the boat during the landing.

20. The damper system of claim 18, wherein the bodies of the first and second sets of dampers have matching outer shapes and sizes.

21. The damper system of claim 20, wherein the outer shapes are either rectangular or cylindrical.

22. The damper system of claim 18, wherein the orifices of the dampers of the first set of dampers are circular in shape with a first diameter and wherein the orifices of the dampers in the second set of dampers are circular in shape with a second diameter differing from the first diameter.

23. The damper system of claim 22, wherein the dampers in the second set of orifices include at least two or more additional orifices providing additional passageways through the sidewalls to the inner chamber.

24. The damper system of claim 18, wherein the fractions of the first and second volumes of the fluid being ejected is in the range of 9/10 to 10/10.

25. The damper system of claim 18, wherein each of the dampers in the first set of dampers is configured to be deformed from the at-rest state to a compressed state, whereby a depth of the body of each of the dampers in the first set of dampers is reduced by a first predefined magnitude, and wherein each of the dampers in the second set of dampers is configured to be deformed from the at-rest state to a compressed state, whereby a depth of the body of each of the dampers in the second set of dampers is reduced by a second predefined magnitude differing from the first predefined magnitude, whereby a maximum amount of travel for the boat after initial contact with the damper system is defined by a combination of the first and second predefined magnitudes.

26. A damper system for use in controlling landing of a boat at a dock, comprising:

a first set of dampers; and a second set of dampers, wherein each of the dampers in the first set of dampers comprises a body, formed of a first flexible material, with an inner chamber defined by exterior sidewalls of the body and with an orifice providing a passageway through the exterior sidewalls to the inner chamber for receiving a first volume of fluid when the body is in an at-rest state, wherein each of the dampers in the second set of dampers comprises a body formed of a second flexible material, with an inner chamber defined by exterior sidewalls of the body and with an orifice providing a passageway through the exterior sidewalls to the inner chamber for receiving a second volume of fluid that differs from the first volume of fluid when the body is in an at-rest state, wherein each of the dampers in the first set of dampers is configured to be deformed from the at-rest state to a compressed state, whereby a depth of the body of each of the dampers in the first set of dampers is reduced by a first predefined magnitude, and wherein each of the dampers in the second set of dampers is configured to be deformed from the at-rest state to a compressed state, whereby a depth of the body of each of the dampers in the second set of dampers is reduced by a second predefined magnitude differing from the first predefined magnitude, whereby a maximum amount of travel for the boat after initial contact with the damper system is defined by a combination of the first and second predefined magnitudes.

27. The damper system of claim 26, wherein the first and second sets of dampers are arranged in first and second adjacent and abutting rows, whereby one of the first and second adjacent and abutting rows is positionable against a surface of the dock and another one of the first and second adjacent and abutting rows is spaced apart from the dock for receiving the boat during the landing.

28. The damper system of claim 26, wherein the bodies of the first and second sets of dampers have matching outer shapes and sizes.

29. The damper system of claim 27, wherein the outer shapes are either rectangular or cylindrical.

30. The damper system of claim 26, wherein the orifices of the dampers of the first set of dampers are circular in shape with a first diameter and wherein the orifices of the dampers in the second set of dampers are circular in shape with a second diameter differing from the first diameter.

31. The damper system of claim 30, wherein the dampers in the second set of orifices include at least two or more additional orifices providing additional passageways through the sidewalls to the inner chamber.

* * * * *